United States Patent [19]

Cole

[11] 4,217,534
[45] Aug. 12, 1980

[54] VEHICLE BATTERY POLARITY INDICATOR

[76] Inventor: Loren Cole, 144 Ione St., Ione, Calif. 95640

[21] Appl. No.: 962,202

[22] Filed: Nov. 20, 1978

[51] Int. Cl.² .............................................. H02J 7/04
[52] U.S. Cl. ......................................... 320/25; 320/2
[58] Field of Search ...................... 320/2, 25, DIG. 1

[56] References Cited

U.S. PATENT DOCUMENTS

| | | | |
|---|---|---|---|
| 3,258,672 | 6/1966 | Godshalk | 320/25 |
| 3,281,816 | 10/1966 | Raymond | 320/25 |
| 3,308,365 | 3/1967 | St. John | 320/DIG. 1 |
| 4,166,241 | 8/1979 | Grant | 320/25 |

Primary Examiner—Robert J. Hickey
Attorney, Agent, or Firm—Lothrop & West

[57] ABSTRACT

Battery jumper cables provide an effective means to connect a charged battery to a discharged battery. However, the electrodes of the batteries must be properly connected for charging to occur and to avoid damage to the batteries. A battery polarity indicator is interposed between a set of battery jumper cables to provide a visual/aural indication of relative battery polarity as well as a safety circuit to prevent electrical connection where polarities are reversed.

3 Claims, 4 Drawing Figures

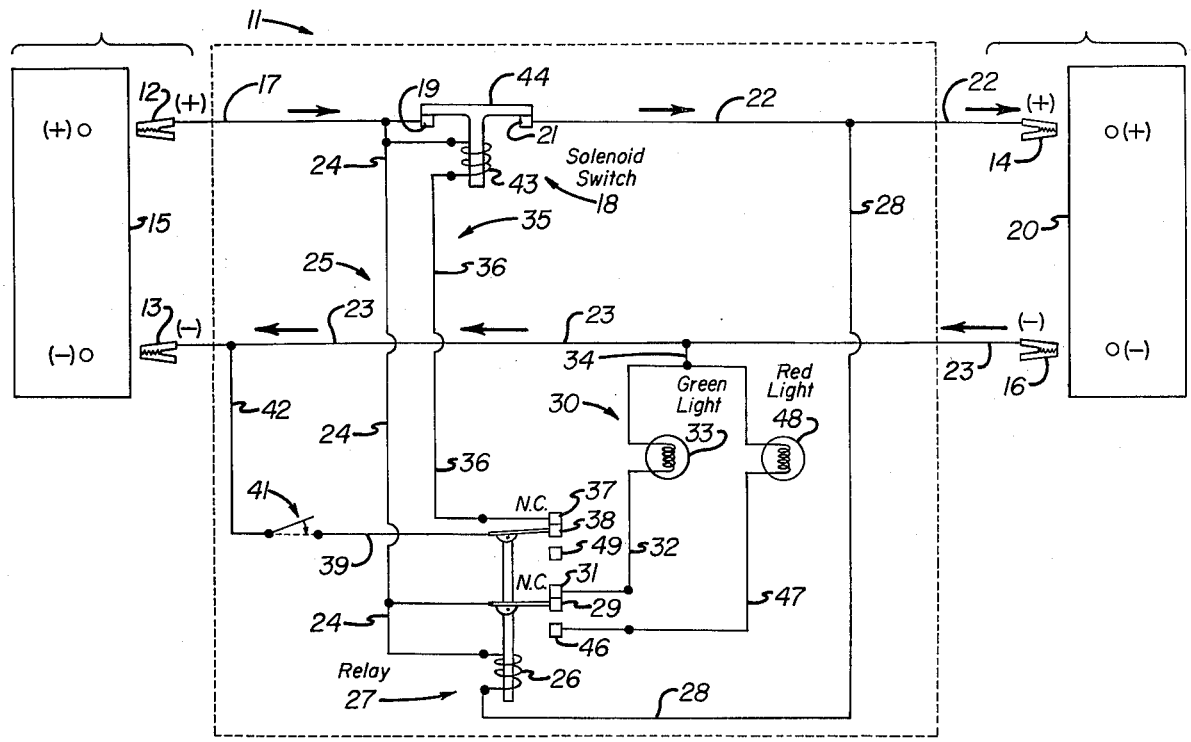
FIG-1 (CORRECT POLARITY)
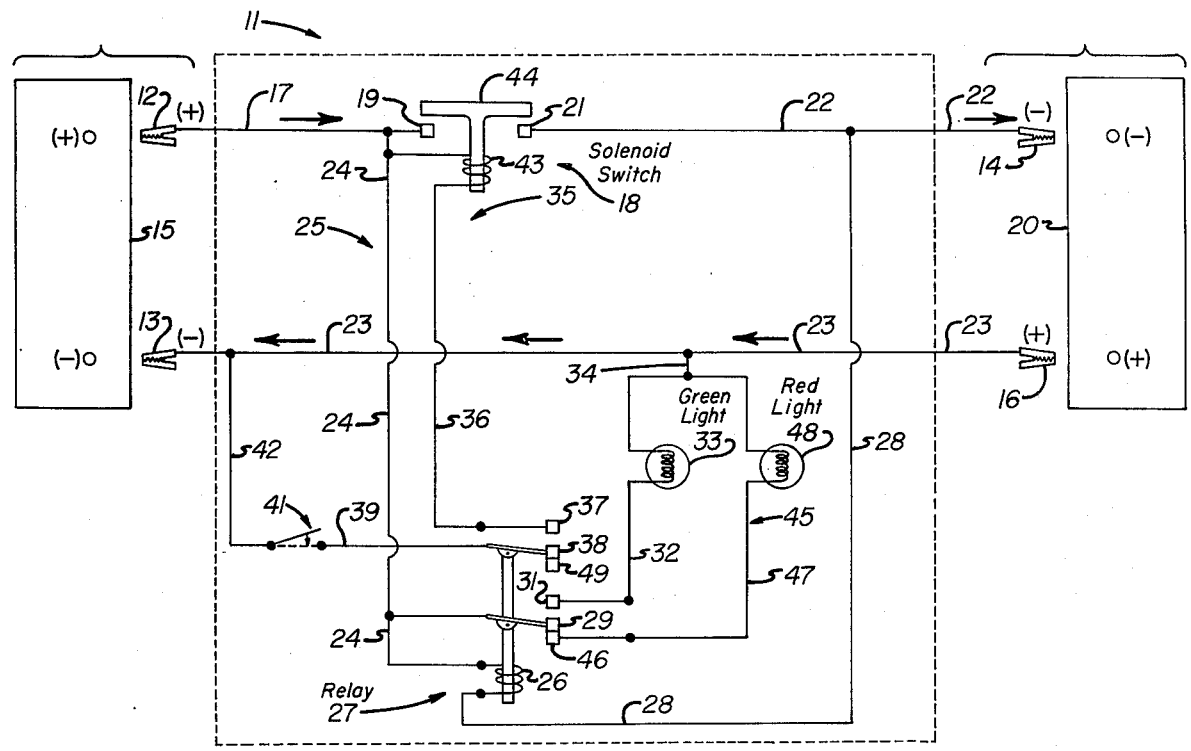
FIG-2 (INCORRECT POLARITY)

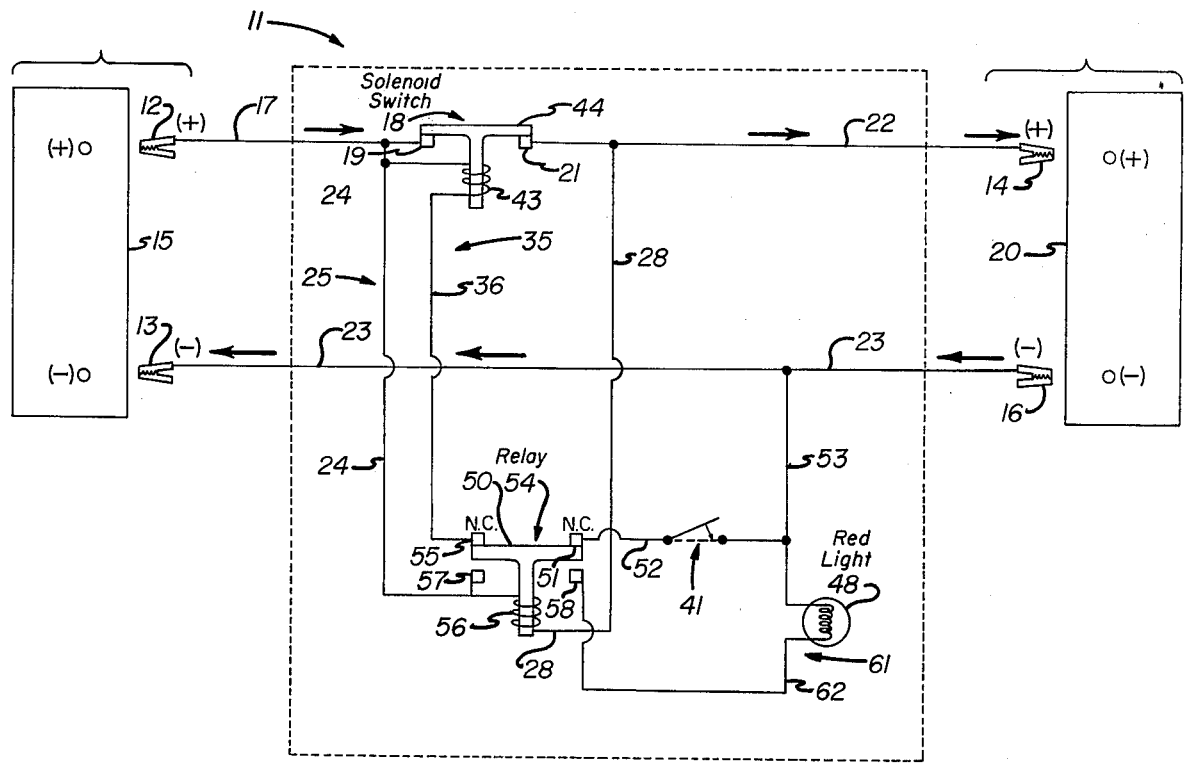
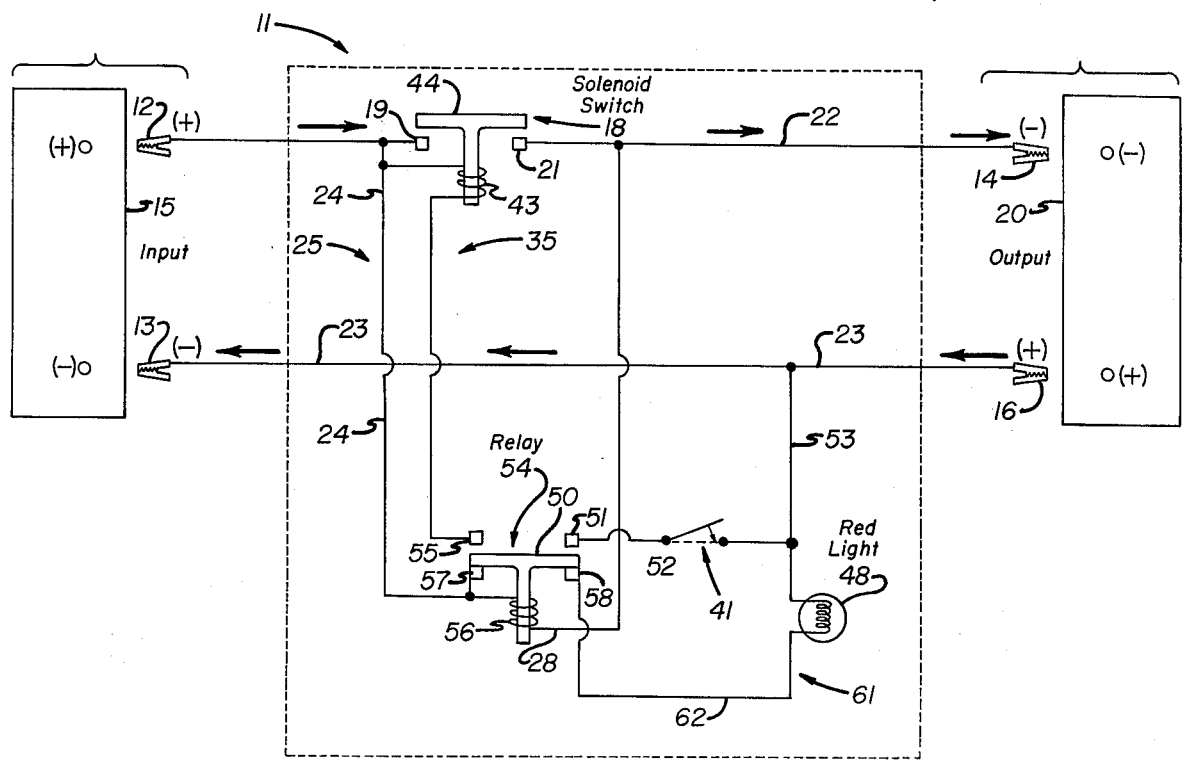

VEHICLE BATTERY POLARITY INDICATOR

BACKGROUND OF THE INVENTION

Rechargeable batteries, such as those commonly found in vehicles, occasionally require recharging from a source external to the vehicle. Battery jumper cables are usually connected from an external power source, a charged battery or a D.C. power supply, to the discharged battery.

It is imperative that the polarities of the external power source and the discharged battery be properly matched. If the polarities are reversed, the discharged battery will be discharged further, rather than being charged. In this state of rapid discharge, current flows in the cables to such an extent that the insulation or conductor may melt. The discharged battery is subject to internal shorting or even explosion, presenting a great hazard to both operating personnel and equipment.

Thus the need exists for a simple and economical means to prevent improper battery connection in the aforementioned situation. The present invention fulfills that need by providing a visual or aural signal to the operator of the polarity condition prior to power transfer, and a safety circuit which prevents inadvertent application of power should the operator fail to heed the signal.

The prior art is not without examples of the genre, including such patents as Godshalk U.S. Pat. No. 3,387,200, Bach et al. U.S. Pat. No. 3,313,995, St. John U.S. Pat. No. 3,308,365, Rockoff U.S. Pat. No. 3,341,762 and Smith U.S. Pat. No. 3,343,057. There still remains, however, considerable room for improvement.

SUMMARY OF THE INVENTION

The invention relates to a battery polarity indicator, interposed between a set of battery jumper cables. These cables are commonly used to recharge a discharged vehicle battery. At one end, the jumper cables are connected to the electrodes of a charged battery of a D.C. supply while at the other end, the jumper cables are connected to the electrodes of a discharged battery.

A pilot power switch on the battery polarity indicator unit remains in the off position until the initial hookup between the batteries has been completed. Following the hookup, either a red or green light (in one embodiment) on the battery polarity indicator unit will illuminate, indicating either incorrect or correct polarity, respectively. If the polarity is correct, the pilot power switch is manually switched to the on position and charging of the discharged battery will commence.

If the polarity is incorrect and the pilot power switch is inadvertently switched to the on position, polarity sensing circuitry disables the power transfer circuitry. Due to this safety feature, the batteries cannot be electrically connected where the polarities of respective electrodes are reversed.

BRIEF DESCRIPTION OF THE FIGURES

FIG. 1 is a schematic diagram of the polarity indicator circuit having a red and green light indicator, with the jumper cables in a condition of proper polarity;

FIG. 2 is a diagram of the polarity indicator circuit as in FIG. 1 but with the jumper cables arranged in reversed polarity;

FIG. 3 is a schematic diagram of a polarity indicator circuit of the single light type, with the jumper cables in a condition of proper polarity; and, FIG. 4 is a schematic diagram of a polarity indicator circuit as in FIG. 3 but with the jumper cables arranged in reversed polarity.

DETAILED DESCRIPTION OF PREFERRED EMBODIMENTS

Referring now to the drawings, and more particularly to FIG. 1, a schematic representation of battery charging circuitry having reverse polarity protection is disclosed. It is to be recognized that the invention can conveniently be used with either battery chargers or booster batteries as an energy supply source.

FIG. 1 illustrates the structure and operation of the invention when the discharged battery is connected in correct polarity with respect to the supply source.

The polarity indicator of the invention, generally designated by the reference numeral 11, comprises a positive input power connector 12 and a negative input power connector 13. The power connectors are preferably spring-urged clips capable of being readily connected to the respective terminals of a suitable D.C. power source, such as a booster battery 15.

Positive bus line 17, or jumper cable, links connector 12 with solenoid switch 18 having a positive input contact 19. Bus line 22 links the solenoid's positive output contact 21 with a positive output power connector 14.

Negative bus line 23, or jumper cable, links negative input connector 13 with negative output connector 16. The discharged, or dead, battery is indicated by reference numeral 20.

As one of the major components of the invention there is provided a polarity sensing circuit 25 comprising an input lead 24, or conductor, interconnecting positive bus 17 with relay coil 26 of relay 27 and an output lead 28 interconnecting the relay coil 26 with the positive bus line 22.

Since the polarities of the supply source 15 and the discharged battery 20 are proper in the arrangement shown in FIG. 1, only a small amount of current will flow through the polarity sensing circuit 25 owing to the relatively small difference in voltage potential between the supply source and the discharged battery. The limited current flowing through relay coil 26 is below the coil's threshold actuating current, being insufficient to cause the relay 27 to operate, thereby confirming that the jumper cables are properly connected.

Advantage is taken of the fact, however, that with a proper connection a very adequate potential difference exists between jumper cables 17 and 23. Visual confirmation of the proper connection is afforded by a proper polarity indication circuit 30, or lamp circuit, comprising a relay bus contact 29 interconnecting the positive input lead 24 with a relay output contact 31. The lamp circuit 30 also includes a green light input lead 32 interconnecting the contact 31 with a green lamp 33, and an output lead 34 interconnecting the green lamp 33 with the negative bus 23.

In operation, under conditions of proper polarity as in FIG. 1, current flows from the positive polarity sensing lead 24 through the normally closed relay contacts 29 and 31 and through the green light 33 to negative bus 23. Proper polarity between the supply source 15 and the discharged battery 20 is thus indicated by the illumination of the green light 33.

A solenoid control circuit 35 comprises a solenoid coil 43 interposed between the polarity sensing input lead 24 and an input lead 36, or conductor, as well as a relay input contact 37 interconnecting the lead 36 and a relay negative bus contact 38. A lead 39 interconnects the contact 38 and a manually operated off-on switch 41, and an output lead 42 connects the switch 41 and the negative bus 23.

Once the power source 15 and the discharged battery 20 are properly interconnected and the green light 33 indicates a proper hookup, the off-on switch 41 is manually thrown, enabling current to flow through the solenoid coil 43 and the normally closed relay contacts 37 and 38. When the solenoid coil 43 is energized, the solenoid bus contact bar 44 is impressed upon the contacts 19 and 21 of the solenoid 18 thus completing the positive bus circuit and allowing charging current to flow from power source 15 to discharged battery 20, as indicated by heavy arrows in FIG. 1.

Turning now to FIG. 2, a structure substantially identical to that of FIG. 1 is represented. However, the jumper cables shown in FIG. 2 are disposed in an improperly polarized hookup between the charged battery 15 and the discharged battery 20.

It should be noted that common elements of the circuitry of FIGS. 1 and 2, as well as FIGS. 3 and 4, are represented by identical reference numerals.

Owing to the considerable difference in voltage potential between the positive input bus line 17 and negative output bus line 22, current readily flows through the polarity sensing circuit 25 comprising the lead 24, the coil 26, and the lead 28. As the coil becomes energized, relay bus contacts 38 and 29 disengage respective relay contacts 37 and 31 and engage dummy relay contact 49 and relay output contact 46, respectively.

An improper polarity indication circuit 45 comprises the relay bus contact 29, interconnecting the input lead 24 with the relay output contact 46. The circuit 45 also includes a red light input lead 47 interconnecting the contact 46 with a red light 48, or lamp, and the output lead 34 interconnecting the red light 48 with the negative bus line 23.

Where the connection between the battery 15 and the battery 20 is improper, as in FIG. 2, current flows from the polarity sensing lead 24 to the relay bus contact 29, thence through the output contact 46, the lead 47 and the red lamp 48, illuminating the red lamp and thereby indicating improper polarity between the supply source 15 and the discharged battery 20.

The continuity of the solenoid control circuit 35 is broken as the relay coil 26 is energized. That is to say, actuation of the relay coil 26 causes the contact 38 to disengage the relay input contact 37 and engage the dummy relay contact 49. Since the control circuit 35 is thereby opened, current cannot flow through the control circuit 35 and the solenoid cannot be energized regardless of the position of the manually controlled off-on switch 41. Thus, the supply source 15 and the discharged battery 20 can never become improperly connected through inadvertance of the user.

Turning now to FIG. 3, an alternative embodiment of the invention is illustrated, namely, a structure using but a single indicator lamp, or warning lamp. The supply source 15 and discharged battery 20 are connected in proper polarity with respect to each other in FIG. 3.

A polarity sensing circuit 25 substantially identical to that depicted in FIGS. 1 and 2 detects the relative polarities of the supply source 15 and the discharged battery 20 when connected by the jumper cables. Since the polarities are correct as shown in FIG. 3, very little current will flow in the polarity sensing circuit 25 comprising the positive input lead 24, relay coil 56, and output lead 28 to positive bus 22. Relay 54 remains in its unenergized position because the amount of current flowing through coil 56 is too small to translate the relay armature.

The solenoid control circuit 35 in this embodiment comprises a solenoid coil 43 interconnecting polarity sensing input lead 24 with input lead 36 as well as relay 54 including an input contact 55 interconnecting the lead 36 with a relay common bus contact bar 50. A relay output contact 51 interconnects the bus contact bar 50 with a lead 52 connected to a manually operated with the negative bus line 23.

Since the polarity sensing circuit 25 has detected a proper polarity hookup and has therefore left relay 54 in its unenergized position, the normally closed relay circuit comprising contact 55, contact bar 50, and contact 51 is able to pass electrical current. As switch 41 is thrown to the on position, the solenoid control circuit 35 is completed and current can pass through solenoid coil 43, causing the solenoid bus contact bar 44 to complete the positive bus line circuit between the power source 15 and the discharged battery 20, allowing charging current to flow as indicated by heavy arrows in FIG. 3.

Directing attention to FIG. 4, a structure substantially identical to that disclosed in FIG. 3 is presented, but the operation is such that polarities of the supply source 15 and the discharged battery 20 are reversed relative to each other.

When the supply source 15 and the discharged battery 20 are improperly connected as in the arrangement shown in FIG. 4, substantial current begins to flow in the polarity sensing circuit 25 owing to the considerable difference in voltage potential between the positive input bus line 17 and negative output bus line 22. Relay coil 56 becomes energized, causing relay contact bar 50 to open the circuit between input contact 55 and output contact 51 and to close the circuit between the relay input contact 57 and the relay output contact 58.

An improper polarity indication circuit 61 comprises relay input contact 57 interconnecting polarity sensing input lead 24 and relay common bus contact bar 50, red light input lead 62 interconnecting relay output contact 58 and red light 48, and output lead 53, interconnecting light 48 with negative bus line 23.

In operation, current flows from line 24 through contact 57, bus contact bar 50, contact 58, conductor 62 and finally to red light 48 and on to bus 23, the illuminated red light indicating an improper hookup of power source 15 and discharged battery 20. The solenoid control circuit 35 is opened by the separation of the bus contact bar 50 from the contact 55 and 51. Thus, should the off-on switch 41 be manually turned on despite the warning provided by the red light, current still cannot flow through solenoid coil 43 due to the open circuit.

Thus, in a manner similar to that of the dual light indicator embodiment of the invention, the single light indicator design provides foolproof protection against improper hookup of power source and discharged battery.

As will be recognized, audible means, such as buzzers, chimes or gongs could be utilized either in lieu of or in addition to the visible signals afforded by the illuminated lights in indicating the propriety or impropriety of the jumper cable connections.

I claim:

1. Vehicle battery polarity indicator comprising:
   a. a first jumper cable connectable at one end to one electrode of a charged battery and at the other end to one electrode of a discharged battery;
   b. a second jumper cable connectable at one end to the other electrode of a charged battery and at the other end to the other electrode of a discharged battery;
   c. a solenoid switch interposed in said first jumper cable between said ends thereof, said solenoid switch including a pair of normally open solenoid contacts, a solenoid coil, and solenoid armature means for closing said solenoid contacts upon energization of said solenoid coil;
   d. a polarity sensing circuit including a first conductor connected at one end to the portion of said first jumper cable between said solenoid switch and the charged battery and at the other end to the portion of said first jumper cable between said solenoid switch and the discharged battery, said first conductor including a relay coil, said relay coil being energized in excess of a threshold amount only when said one electrode of the charged battery is of reversed polarity with respect to said one electrode of the discharged battery;
   e. a relay magnetically actuated by said relay coil only when said relay coil is energized in excess of said threshold amount, said relay including at least one switch; and,
   f. an off-on safety circuit including a second conductor having one end connected to the portion of said first jumper cable between said solenoid switch and the charged battery and the other end connected to said second jumper cable, said off-on safety circuit including a manually operated off-on switch interposed in said second conductor, said second conductor being connected to said solenoid coil and to one of said relay switches and to said off-on switch in series so that both said one of said relay switches and said off-on switch must be closed to energize said solenoid coil and thus close said normally open solenoid switch in order to effect charging of the discharged battery.

2. A vehicle battery polarity indicator as in claim 1 further including a reverse polarity indicating circuit comprising a third conductor interconnecting said first conductor and said second jumper cable, a red lamp interposed in said third conductor, and another of said relay switches interposed in said third conductor in series with said red lamp so that said red lamp is illuminated when the threshold current in said relay coil is exceeded as a result of reverse polarity and said relay is actuated so as to close said another of said relay switches and energize said third conductor.

3. A vehicle battery polarity indicator as in claim 2 further including a proper polarity indicating circuit including a fourth conductor interconnecting said first conductor and said second jumper cable, a green lamp interposed in said fourth conductor, and still another of said relay switches interposed in said fourth conductor in series with said green lamp, said green lamp being illuminated by current flow from said first jumper cable to said second jumper cable connected in proper polarity.

* * * * *